(12) United States Patent
Wijnands et al.

(10) Patent No.: US 7,852,841 B2
(45) Date of Patent: Dec. 14, 2010

(54) IN-BAND MULTICAST SIGNALING USING LDP

(75) Inventors: Ijsbrand Wijnands, Leuven (BE); Arjen Boers, Sitges (ES); Toerless Eckert, Mountain View, CA (US); John S. Meylor, Auburn, CA (US)

(73) Assignee: Cisco Technology, Inc., San Jose, CA (US)

( * ) Notice: Subject to any disclaimer, the term of this patent is extended or adjusted under 35 U.S.C. 154(b) by 861 days.

(21) Appl. No.: 11/267,674

(22) Filed: Nov. 4, 2005

(65) Prior Publication Data

US 2007/0104194 A1 May 10, 2007

(51) Int. Cl.
*H04L 12/28* (2006.01)

(52) U.S. Cl. .................................. 370/390; 370/395.5

(58) Field of Classification Search ........................ None
See application file for complete search history.

(56) References Cited

U.S. PATENT DOCUMENTS

| 6,374,303 | B1 * | 4/2002 | Armitage et al. ............ 709/242 |
| 6,778,531 | B1 * | 8/2004 | Kodialam et al. ........... 370/390 |
| 6,947,428 | B1 | 9/2005 | Andersson et al. ....... 370/395.5 |
| 7,260,097 | B2 | 8/2007 | Casey ......................... 370/392 |
| 7,281,058 | B1 | 10/2007 | Shepherd et al. ............ 709/238 |
| 7,558,219 | B1 * | 7/2009 | Aggarwal et al. ........... 370/256 |
| 2002/0067724 | A1 * | 6/2002 | Helm et al. ................. 370/390 |
| 2003/0005074 | A1 * | 1/2003 | Herz et al. .................. 709/216 |
| 2003/0058857 | A1 * | 3/2003 | Maher et al. ................ 370/390 |
| 2003/0131228 | A1 * | 7/2003 | Twomey ..................... 713/153 |
| 2003/0133412 | A1 * | 7/2003 | Iyer et al. ................... 370/235 |
| 2004/0125803 | A1 * | 7/2004 | Sangroniz et al. ........... 370/390 |
| 2004/0233907 | A1 * | 11/2004 | Hundscheidt et al. ....... 370/390 |
| 2005/0076143 | A1 * | 4/2005 | Wang et al. ................. 709/245 |
| 2005/0169266 | A1 | 8/2005 | Aggarwal et al. ........... 370/389 |
| 2005/0169270 | A1 | 8/2005 | Mutou et al. ................ 370/390 |
| 2006/0007931 | A1 | 1/2006 | Wright et al. ............... 370/392 |
| 2006/0029001 | A1 * | 2/2006 | Mensch et al. .............. 370/254 |
| 2006/0039364 | A1 | 2/2006 | Wright ....................... 370/352 |
| 2006/0062218 | A1 | 3/2006 | Sasagawa ................... 370/389 |
| 2006/0147204 | A1 | 7/2006 | Yasukawa et al. ............ 398/26 |
| 2006/0159009 | A1 | 7/2006 | Kim et al. ................... 370/216 |

(Continued)

OTHER PUBLICATIONS

Yuan Gao, RMCM: reliable multicasts for core-based multicast trees, Nov. 14, 2000, IEEE, International Conference on Network Protocols, 2000. Proceedings, pp. 83-94.*

(Continued)

*Primary Examiner*—Jayanti K Patel
*Assistant Examiner*—Hooman Houshmand
(74) *Attorney, Agent, or Firm*—Campbell Stephenson LLP

(57) ABSTRACT

A mechanism is provided by which a transport tree identifier can be generated using one or more identifiers for a multicast datastream. The transport tree identifier can then be used in the process of building a transport tree across a transport network. A transport network egress router can receive a request to join a multicast datastream from a downstream node outside of the transport network. The information contained in the join message that identifies the desired multicast datastream can be encoded in the transport tree identifier. The transport tree identifier can be related to one or more of a multicast group destination address, a multicast datastream source address, and a broadcast domain identifier.

15 Claims, 10 Drawing Sheets

U.S. PATENT DOCUMENTS

| | | | |
|---|---|---|---|
| 2006/0182105 A1 | 8/2006 | Kim et al. | 370/389 |
| 2006/0221958 A1 | 10/2006 | Wijnands et al. | 370/389 |
| 2006/0221975 A1 | 10/2006 | Lo et al. | 370/395.5 |
| 2007/0058646 A1 | 3/2007 | Hermoni | 370/401 |
| 2007/0104194 A1 | 5/2007 | Wijnands et al. | 370/390 |
| 2007/0140107 A1* | 6/2007 | Eckert et al. | 370/216 |
| 2007/0195778 A1 | 8/2007 | Tatar et al. | 370/392 |
| 2007/0263634 A1* | 11/2007 | Reeves et al. | 370/395.2 |
| 2008/0175240 A1* | 7/2008 | Suzuki | 370/390 |
| 2008/0253379 A1* | 10/2008 | Sasagawa | 370/395.5 |

OTHER PUBLICATIONS

D. Ooms, et al., "Framework for IP Multicast in MPLS," Internet Draft, Submitted to MPLS Working Group, May 1999, pp. 1-29 & Figures 1 & 2.

Aggaral et al., "PIM-SM Extensions for Supporting Remote Neighbors," Network Working Group, Internet Draft, Jul. 2004, pp. 1-7.

Seisho Yasukawa, et al., "BGP/MPLS IP Multicast VPNs," Networking Working Group, IETF Internet Draft, Feb. 2005, pp. 1-24.

Ijsbrand Wijnands, et al., "Multicast Extension for LDP," Network Working Group, Internet Draft, Mar. 2005, pp. 1-12.

Andersson, Loa et al., "LDP Specification," Network Working Group, Internet Draft Oct. 2005; pp. 1-135.

Minei, I. et al, "Label Distribution Protocol Extensions for Point-to-Point Multipoint Label Switched Paths," Jul. 17, 2005, pp. 1-15.

Ooms, D., et al. "MPLS Multicast Traffic Engineering," Feb. 2002, pp. 1-13.

Rosen, E., et al., "Multiprotocol Label Switching Architecture," Request for Comments 3031, Jan. 2001, pp. 1-24.

Pan, Ping, et al., "Pseudo Wire Protection," Network Working Group, Internet Draft; Jul. 2005; pp. 1-15.

* cited by examiner

IN-BAND MULTICAST SIGNALING USING LDP

FIELD OF THE INVENTION

This invention relates to the field of information networks, and more particularly relates to transporting a multicast datastream across a transport network by building a transport tree using a transport tree identifier that includes encoded information about the multicast datastream.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase. As a business grows, so can its network, increasing in the number of network elements coupled to the network, the number of network links, and also geographic diversity. Over time, a business' network can include physical locations scattered throughout a city, a state, a country, or the world. Since it can be prohibitively expensive to create a private network that spans these great distances, many businesses opt to rely upon a third-party provider's network to provide connectivity between the disparate geographic sites of the business. In order for the business' network to seamlessly function through the provider network, the provider network must be able to provide a medium for transmission of all the business' various types of datastreams, including multicast transmission.

Multicast routing protocols enable multicast transmission (i.e., one-to-many connections and many-to-many connections) by replicating a multicast network packet close to the destination of that packet, obviating the need for multiple unicast connections for the same purpose; thus, saving network bandwidth and improving throughput. Upon receiving a multicast packet, a network node can examine a multicast group destination address (GDA) of the packet and determine whether one or more downstream subscribers to the multicast packet (i.e., members of the multicast group) are connected to the network node (either directly or indirectly). The network node can then replicate the multicast packet as needed and transmit the replicated packets to any connected subscribers.

FIG. 1A is a simplified block diagram of a network performing a multicast transmission. Network router elements 110, 120, 130 and 140 are coupled through network links 150, 160, and 170. Network router element 110 is also coupled to network elements 111 and 112; network router element 120 is coupled to network element 121; network router element 130 is coupled to network elements 131 and 132; and, network router element 140 is coupled to network element 141. Such coupling between the network router elements and the network elements can be direct or indirect (e.g., via a L2 network device or another network router element).

For the purposes of this illustration, network element 111 is a multicast source transmitting to a multicast group that includes network elements 112, 121, 131, 132 and 141. A multicast datastream having a group destination address to which the above network elements have subscribed as receiver members is transmitted from network element 111 to network router element 110 (illustrated by the arrow from 111 to 110). Network router element 110 determines where to forward multicast datastream packets by referring to an internal address table that identifies each port of network router element 110 that is coupled, directly or indirectly, to a subscribing member of the multicast group. Network router element 110 then replicates multicast datastream packets and transmits the replicated packets from the identified ports to network element 112, network router element 120 and network router element 130.

Network router elements 120 and 130 can inform network router element 110 that they are coupled to a multicast datastream subscriber using a network message format, such as protocol independent multicast (PIM). Using PIM, network router elements 120 and 130 can send messages indicating that they need to join (a "JOIN" message) or be excluded from (a "PRUNE" message) receiving packets directed to a particular multicast group or being transmitted by a particular source. Similarly, a network element can inform a first-hop network router element that the network element wishes to be a subscriber to a multicast group by sending a "JOIN" request through a software protocol such as internet group management protocol (IGMP). When a network element wishes to subscribe to a multicast transmission, a special IGMP protocol frame can be transmitted as a multicast "JOIN" request. An IGMP-enabled network router element (or a L2 network device) can have "snooping" software executing to read such a frame and build a corresponding entry in a multicast group address table.

Upon receipt by network router elements 120 and 130, multicast datastream packets can be replicated by those network router elements as needed in order to provide the multicast datastream to network elements coupled to those network router elements (e.g., network elements 131 and 132 or network router element 140). In this manner, a multicast datastream from network element 111 can be transmitted through a network to multiple receiving network elements. The path of such a transmission can be thought of as a tree, wherein network element 111 is the root of the tree and network elements 121, 131, 132, and 141 can be thought of as the tips of branches.

FIG. 1B is a simplified block diagram of a network in which multiple sources are transmitting to a multicast group. As in FIG. 1A, network element 111 is a source for a multicast datastream directed to a multicast group including network elements 112, 121, 131, 132, and 141. That multicast datastream is illustrated by path 180 (a solid line). Network element 132 is also transmitting a multicast datastream to the multicast group, and that datastream is illustrated by path 190 (a dashed line). In a multiple source multicast group, any subscriber network element can be a source. In order to provide this two-way routing of multicast data packets, a bi-directional version of protocol independent multicast (PIM bidir) is used to configure the network router elements in the multicast tree. In such bi-directional multicast, datastream packets are routed only along the shared bi-directional tree, which is rooted at a rendezvous point for the multicast group, rather than at a particular datastream source. Logically, a rendezvous point is an address (e.g., a network router element) that is "upstream" from all other network elements. Passing all bi-directional multicast traffic through such a rendezvous point, establishes a loop-free tree topology with a root at the rendezvous point.

FIGS. 1A and 1B illustrate transmission of multicast datastreams in a network in which the network router elements 110, 120, 130 and 140 are directly coupled with one another. But, as stated above, as a business and its network grow, a business' network can become geographically diverse, and therefore the path over which the datastream must flow can include an intervening third-party provider network.

FIG. 2 is a simplified block diagram illustrating a network configuration in which geographically diverse subnets of a business' network are coupled through a transport network 255 (also called a provider network). The business' network includes network router elements 210, 220, 230, and 240, wherein network router element 210 is coupled to network elements 211 and 212, network router element 220 is coupled to network element 221, network router element 230 is coupled to network elements 231 and 232, and network router element 240 is coupled to network element 241. In order to connect to the transport network, a network router element on the edge of the business' network (a customer edge router) is coupled to a network router element on the edge of the transport network (a provider edge router). In FIG. 2, customer edge router elements 250(1-3) are coupled to provider edge router elements 260(1-3), respectively. Network router element 240 is coupled to provider edge router element 260(4) (that is, network router element 240 is configured as a customer edge router).

It should be noted that customer edge router and provider edge router functionality can be provided by a single router. Further, a network router element such as 240 can also serve as an edge router. The provider edge routers provide access to the transport network which can contain data transmission lines, network router elements, and OSI. Level 2 network devices to aid in the transmission of data from one provider edge router to another provider edge router. The transport network illustrated in FIG. 2 contains, as an example, network router elements 270(1-5) and 270(r), which are coupled in a manner to permit transmission of packets through the provider network. A transport network is not limited to such a configuration, and can include any number of network router elements, transmission lines, and other L2 and L3 network devices.

In order to facilitate transmission of data through the transport network, the transport network can utilize different protocols from those used in coupled customer networks. Such transport network protocols can permit faster data transmission and routing through the network. Any needed translation between customer and transport network protocols can be performed by the edge routers. One such routing protocol that can be used by a transport network is multiprotocol label switching (MPLS).

In a typical router-based network, OSI. Layer 3 packets pass from a source to a destination on a hop-by-hop basis. Transit routers evaluate each packet's Layer 3 header and perform a routing table lookup to determine the next hop toward the destination. Such routing protocols have little, if any, visibility into the network's OSI. Layer 2 characteristics, particularly in regard to quality of service and link load.

To take such Layer 2 considerations into account, MPLS changes the hop-by-hop paradigm by enabling edge routers to specify paths in the network based on a variety of user-defined criteria, including quality of service requirements and an application's bandwidth needs. That is, path selection in a router-only network (Layer 3 devices) can now take into account Layer 2 attributes. In light of this dual nature, MPLS routers are called label switch routers (LSRs).

In an MPLS network, incoming datastream packets are assigned a label by an edge label switch router (e.g, provider edge router element 260(1)). An edge LSR has one or more network interfaces connected to other LSRs within the provider network and one or more other network interfaces connected to non-MPLS enabled devices (e.g., a customer edge router). The label takes the form of a header created by the edge LSR and used by LSRs within the provider network to forward packets. An LSR will create and maintain a label forwarding information base (LFIB) that indicates where and how to forward packets with specific label values. The LSRs that are within a provider's network (non-edge LSRs) are commonly called core LSRs, which switch labeled packets based on the label value in the label header. All interfaces of a core LSR are connected to other LSRs (either core or edge). The path defined by the labels through core LSRs between a pair of edge LSRs is called a label switch path (LSP). Label information is distributed among the LSRs through the use of a label distribution protocol (LDP). LDP is also integral in building an LSP through an MPLS network. Packets are forwarded within the core network along the label switch path where each LSR makes forwarding decisions based solely on the contents of the label. At each hop, an LSR may strip off the existing label and apply a new label which tells the next hop how to forward the packet.

FIG. 3 is a simplified block diagram illustrating a path a datastream can take through an MPLS network. In FIG. 3, a series of LSRs (edge and core) interconnect, form a physical path between two network elements, 390 and 395, which are connected to the MPLS network through customer edge routers 370 and 380. An Ethernet frame carrying an IP datagram generated by network element 390 will follow the standard Ethernet format with a normal Layer 2 header followed by a Layer 3 header. Because the destination address resides in a different network, customer edge router 370 forwards a packet including the IP datagram to edge LSR 310. Edge LSR 310 references its internal forwarding table (also known as a forwarding information base (FIB)) and determines that it needs to forward a packet including the IP datagram via interface 310(2) toward edge LSR 320.

The core of the MPLS network includes core LSRs 330, 340, 350, 360, which are coupled, directly or indirectly, to edge LSRs 310 and 320.

The FIB entry for the destination network in ingress edge LSR 310 indicates that edge LSR 310 must include a label with the packet to indicate what path the packet should take on its way to egress edge LSR 320 and from there to destination network element 395. The label can be inserted before the Layer 3 header in the frame passed from edge LSR 310 to the next hop core LSR 350. Core LSR 350 receives the frame at interface 350(1) and determines the presence of the label. Core LSR 350 then treats the packet according to the configuration in its label forwarding information base (LFIB), which directs the core LSR to forward the packet via interface 350(3) and to replace the old incoming label with a new outgoing label. Core LSR 360 will then handle the packet in a similar manner, receiving the packet at interface 360(1) and transmitting the packet via interface 360(4), after having stripped the label added at core LSR 350 and inserting a new label.

Edge LSR 320 is the egress point from the MPLS network for the packet. Edge LSR 320 performs a label lookup in the same way as the previous LSRs, but will have no outgoing label to use. Edge LSR 320 will then strip off all label information and pass a standard packet including the IP datagram to customer edge router 380, which will then transmit the IP frame to network element 395. It should be noted that the LSP between edge LSRs 310 and 320 can take different links than the ones indicated in FIG. 3. The table below illustrates the incoming and outgoing interface and incoming and outgoing label changes that occur at each LSR in the illustrated LSP.

TABLE 1

| Router | Incoming Label | Incoming Interface | Destination Network | Outgoing Interface | Outgoing Label |
|--------|----------------|--------------------|--------------------|--------------------|----------------|
| 310    | —              | 310(e0)            | B                  | 310(2)             | 6              |
| 350    | 6              | 350(1)             | B                  | 350(3)             | 11             |
| 360    | 11             | 360(1)             | B                  | 360(4)             | 7              |
| 320    | 7              | 320(2)             | B                  | 320(e0)            | —              |

A non-MPLS router makes a forwarding decision based on reading a Layer 3 destination address carried in a packet header and then comparing all or part of the Layer 3 address with information stored in the forwarding information base (FIB) maintained by the router. The non-MPLS router constructs the FIB using information the router receives from routing protocols. To support destination-based routing with MPLS, an LSR also is configure to use routing protocols and construct the LFIB using information the LSR receives from these protocols. An LSR must distribute, receive, and use allocated labels for LSR peers to correctly forward the frame. LSRs distribute labels using a label distribution protocol (LDP). A label binding associates a destination subnet with a locally significant label (see, e.g., Table 1). Labels are "locally significant" because they are replaced at each hop. Whenever an LSR discovers a neighbor LSR, the two LSRs established a connection to transfer label bindings.

LDP can exchange subnet/label bindings using one of two methods: downstream unsolicited distribution or downstream-on-demand distribution. Downstream unsolicited distribution disperses labels if a downstream LSR needs to establish a new binding with its neighboring upstream LSR. In downstream-on-demand distribution, a downstream LSR sends a binding upstream only if the upstream LSR requests it. For each router in an upstream LSR's route table, the upstream LSR identifies the next hop for that route. The upstream LSR then issues a request (via LDP) to the downstream (next hop) LSR for a label binding corresponding to the downstream LSR. When the downstream LSR receives the request, the downstream LSR allocates a label, creates an entry in its LFIB with the incoming label set to the newly allocated label, and then the downstream LSR returns a binding between the newly allocated label and the route to the upstream LSR that sent the original request. When the upstream LSR receives the binding information, the upstream LSR creates an entry in its LFIB and sets the outgoing label in the entry to the value received from the downstream LSR. In a network using downstream-on-demand distribution, this process is repeated recursively until the destination is reached.

When an LSR receives a packet with a label, the LSR uses the label for an index search in the LSR's LFIB. Each entry in the LFIB consists of an incoming label (the LFIB index) and one or more subentries of the form: outgoing label, outgoing interface, and outgoing link-level information. If the LSR finds an entry with the incoming label equal to the label carried in the packet, for each component in the entry, the LSR replaces the label in the packet with the outgoing label, replaces link level information (such as the MAC address) in the packet with the outgoing link-level information, and forwards the packet over the outgoing interface. This forwarding decision uses an exact-match algorithm using a fixed-length, fairly short (as composed to an L3 address) label as an index. Such a simplified forwarding procedure enables a higher forwarding performance, and can be implemented in LSR hardware rather than software.

As stated above, transport network may not operate under the same protocols as do the coupled customer networks. Transport networks can operate, for example, using IPv4 using MPLS, while a customer network can use IPv6IPv4, or another networking protocol. It is desirable to transmit multicast packets originating in an IPv6 or IPv4 customer network through a transport network. Multicast transmission through an MPLS network can result in multiple egress edge LSRs receiving a datastream entering the MPLS network at a single ingress edge LSR. Such a transport tree, a point-to-multipoint LSP, through an MPLS network has a similar form to the multicast tree discussed above, wherein the root of the tree is the ingress LSR. Similarly, multipoint-to-multipoint transport trees can be formed to transport multiple-source multicast datastreams.

In order to transmit a multicast datastream across a transport tree in a transport network, such as MPLS, an association between the multicast datastream and the transport tree is made at the ingress router(s). An ingress router can then transmit the multicast datastream on the associated transport tree across the transport network. Ingress routers also pass multicast join/prune messages along to routers upstream toward the source of the multicast datastream. In order to perform these tasks, identifying information for a multicast datastream must be passed to the ingress router by an egress router joining the multicast datastream. One mechanism for identifying information to be passed is a communication protocol that permits an egress router to communicate directly with an ingress router. Such a communication protocol is considered "out-of-band" from tree-building protocols used in a transport network. Further, such communication can require additional communications between the ingress router and the egress router after a transport tree is established in order to associate the transport tree with a multicast datastream. A more efficient solution is to transmit multicast datastream identification information at the same time the transport tree is built, thereby allowing transport tree and multicast datastream information to be associated concurrently upon an ingress router acting upon a request to build a transport tree. It is therefore desirable to provide a mechanism by which a multicast datastream identifier can be inserted in a tree-building protocol, such as LDP, to permit in-band provisioning of a multicast identifier with a transport tree.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a mechanism by which a transport tree identifier can be generated using one or more identifiers for a multicast datastream. The transport tree identifier can then be used in the process of building a transport tree across a transport network. In one aspect of the present invention, a transport network egress router receives a request to join a multicast datastream from a downstream node outside of the transport network. The information contained in the join message that identifies the desired multicast datastream is encoded in the transport tree identifier. In a further aspect of the present invention, the transport tree identifier is related to one or more of a multicast group destination address, a multicast datastream source address, and a broadcast domain identifier.

In a typical transport network, core routers within the transport network do not interpret a transport tree identifier beyond using the transport tree identifier as a mechanism for identifying the transport tree across the transport network. Transport tree building messages contain the transport tree identifier as such messages propagate across the transport network. In one embodiment of the present invention, upon receiving a transport tree building message incorporating the transport tree identifier, an ingress router can decode the transport tree identifier to determine the multicast datastream identifying information. The ingress router can use the multicast datastream identifying information to (1) link the multicast datastream with the transport tree so that packets from the multicast datastream are transmitted along that transport tree, and (2) transmit to an upstream router or network element, outside of the transport network, a request to join the identified multicast datastream.

Figure 1A:
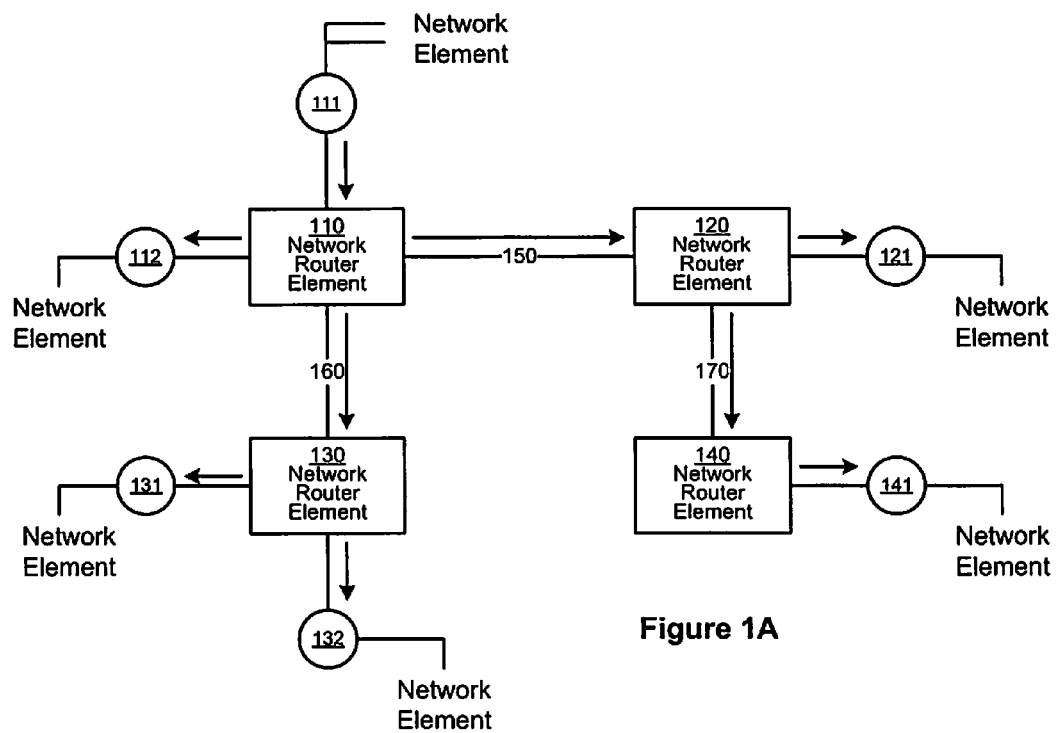
FIG. 1A is a simplified block diagram of a network performing a multicast transmission.
Figure 1B:
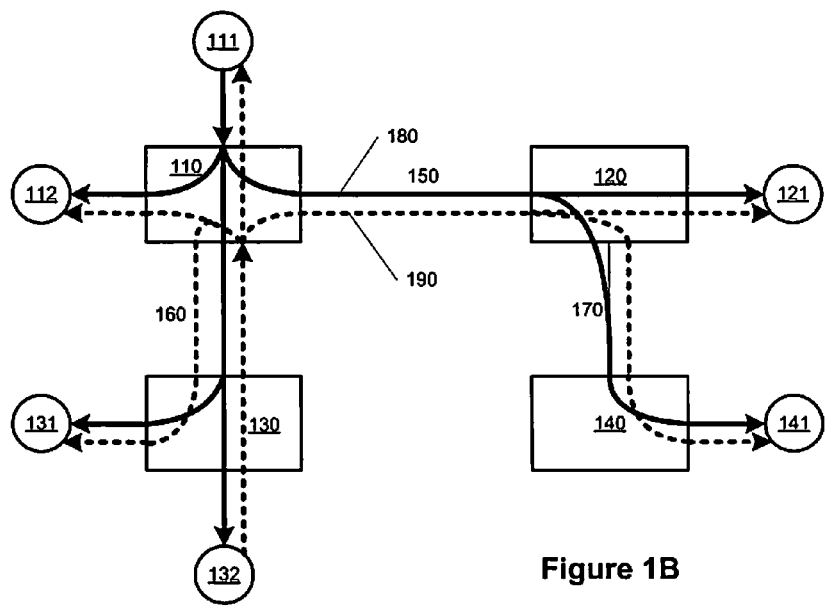
FIG. 1B is a simplified block diagram of a network in which multiple sources are transmitting to a single multicast group.
Figure 2:
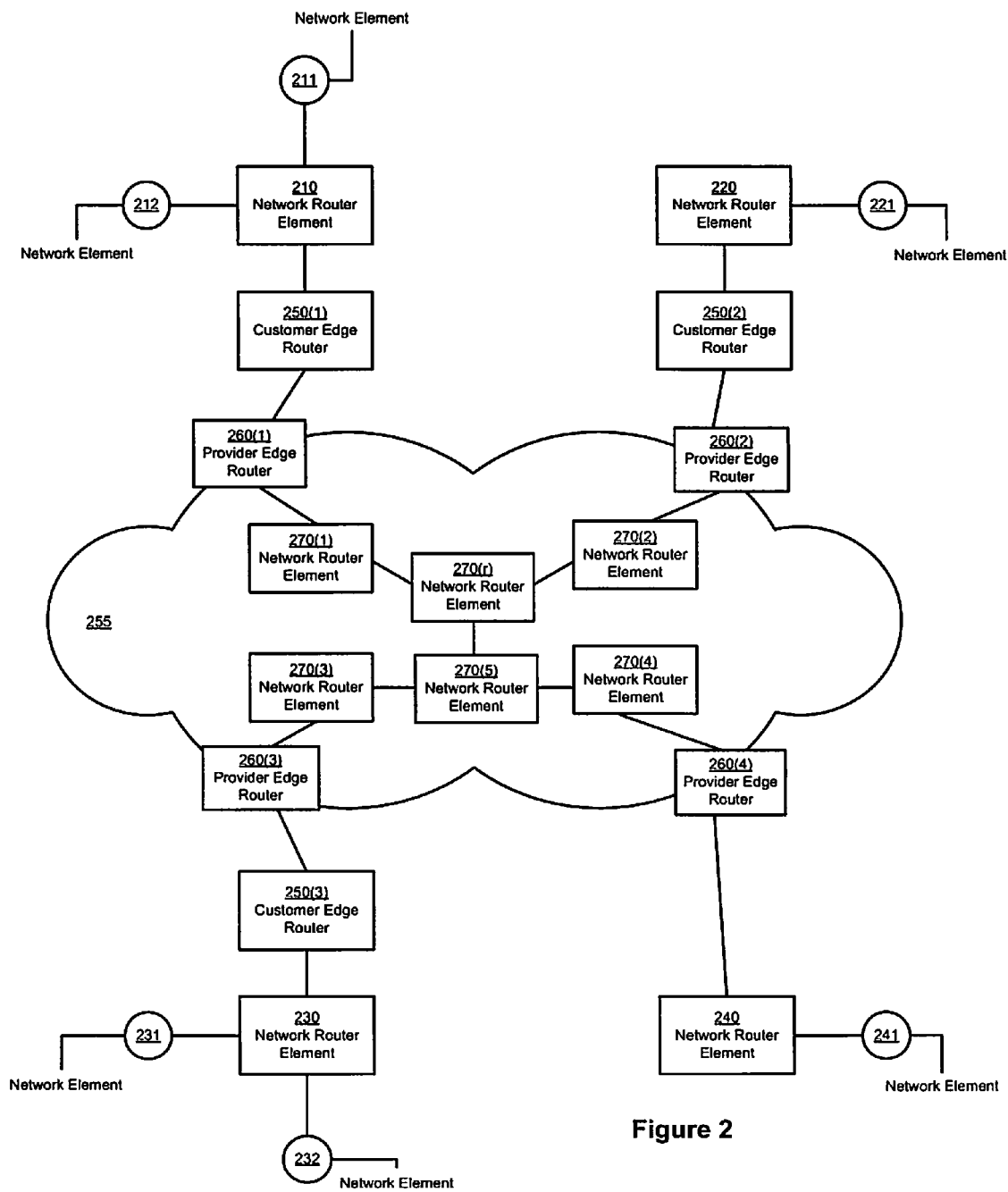
FIG. 2 is a simplified block diagram illustrating a network configuration in which geographically diverse subnets of a business' network are coupled through a third-party provider network.
Figure 3:
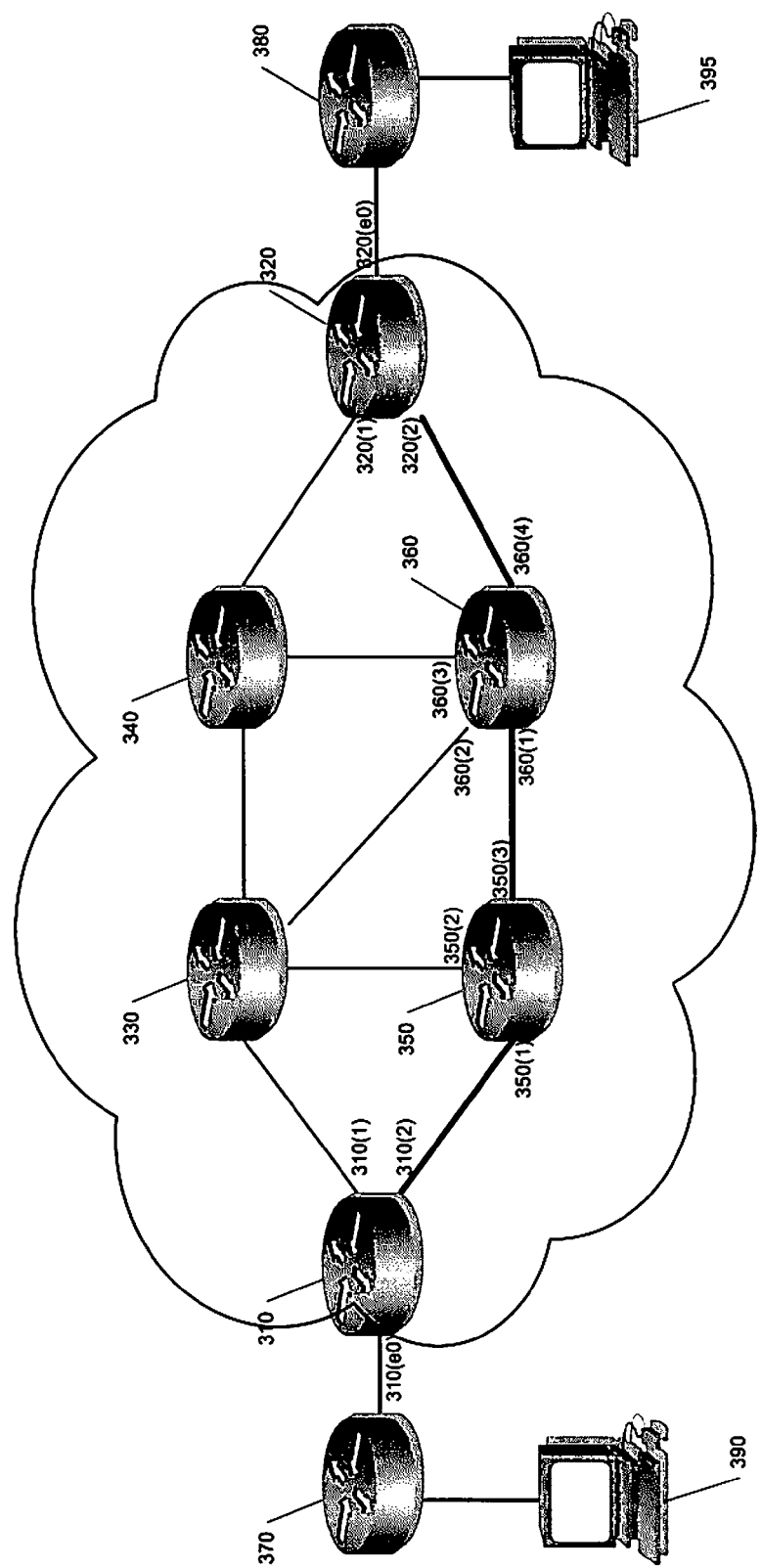
FIG. 3 is a simplified block diagram illustrating a datastream path through an MPLS network.

As discussed above, FIG. 2 illustrates a scenario in which a geographically diverse customer network is coupled using a transport network 255. Network element 221 can transmit a join message for a multicast transmission from network element 211 to router element 220 using an appropriate protocol (e.g., IGMP). The join message can include a multicast source identifier (e.g., the address for network element 211) and a group destination address identifier. Router element 220 can determine a next hop router in an upstream direction toward network element 211 (e.g., network router 250(2)) and transmit a router-to-router multicast membership request (e.g., a PIM join message). Router element 250(2) can perform a similar transmission to an upstream next-hop router, here transport network edge router 260(2). As this point, the upstream network path enters transport network 255.

The core routers of transport network 255 do not necessarily use protocols such as PIM, and therefore such protocols cannot be used to link routers through the transport network. As discussed above, a transport network can have a different set of protocols used to build transport trees across the network and through which the core routers can communicate (e.g., MPLS). By inspecting routing tables, edge router 260(2) can determine that edge router 260(1) is an upstream next-hop edge router toward the source of the desired multicast datastream. Through the use of transport tree building protocols for the transport network, a transport tree can be built between edge routers 260(2) and 260(1). In the case of an MPLS transport network, a transport tree-building protocol is the label distribution protocol (LDP).

When building a transport tree across an MPLS network, LDP exchanges labels between transport network routers. LDP can also provide a transport tree identifier that the transport network routers can use to reference the transport tree. In LDP, a transport tree identifier is a Forwarding Equivalency Class (FEC) value. As an example, transport network routers can store a table that maps a transport tree identifier to entries in an LFIB. An ingress edge router can also use the transport tree identifier to associate a transport tree with a multicast datastream, in order to transmit packets in the multicast datastream along a transport tree identified by the transport tree identifier.

In order to associate a transport tree identifier with a multicast datastream identifier, the ingress router needs information linking the two pieces of information from the egress router that initiated the transport tree building. An egress router can signal to an ingress router the identity of a multicast datastream to be forwarded on a transport tree identified by a transport tree identifier using overlay signaling. Such a method involves an additional out-of-band protocol to permit an exchange of information between the egress router and to the ingress router. Another method to provide information linking the multicast datastream identification to the transport tree identifier is through an in-band signaling using the transport tree building protocol.

In one embodiment of the present invention, multicast datastream information can be provided to an ingress edge router by encoding the multicast datastream information into a transport tree identifier. As an example of such an embodiment, an egress edge router, in an MPLS transport network, that receives a multicast join request can encode into an FEC value multicast datastream information such as source address, group destination address, and broadcast domain identifier (e.g., VLAN identifier, VPN identifier, resource descriptor, or route distinguisher), which is then inserted into a tree building request. In one aspect of this embodiment, the multicast datastream information can be included in one part of the FEC value (an opaque field) that is not interpreted by core routers, and an identifier of the root of the transport tree can be included in another part of the FEC value. The core routers within the transport network can use the FEC value as a mechanism to identify the transport tree and do not decode the FEC opaque field value. Once an ingress edge router receives the tree-building request, the ingress edge router can decode the multicast datastream identifier information from the FEC opaque field value. In order to provide consistent encoding and decoding, all edge routers in a transport network agree on a formula to encode the multicast datastream identification information in an FEC. The ingress edge router can then use the multicast datastream identification information to associate the identified multicast datastream with the transport tree.

Although descriptions of the present invention use MPLS as an example of the transport network and MPLS-related protocols, the invention is not limited in its application to MPLS transport networks or MPLS-related protocols.

Figure 4:
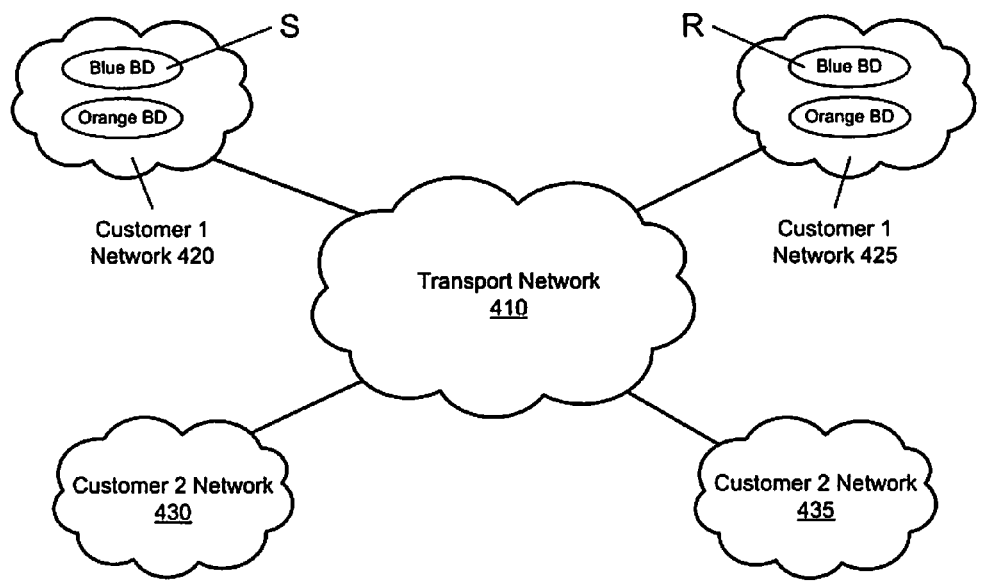
FIG. 4 is a simplified representation of a transport network coupling geographically separated customer networks.

FIG. 4 is a simplified representation of a transport network coupling geographically separated customer networks. Transport network 410 is used by Customers 1 and 2 to couple their respective network subnets. Customer 1 has networks 420 and 425 coupled through transport network 410, while Customer 2 has networks 430 and 435 coupled through transport network 410. In addition Customer 1 has configured a Blue and Orange broadcast domain (e.g., VPNs) in Customer 1's networks 420 and 425. A source for a multicast transmission is included within the Blue broadcast domain of Customer 1 network 420 and a requesting receiver for that multicast datastream is included within the Blue broadcast domain of Customer 1 network 425.

Figure 5:
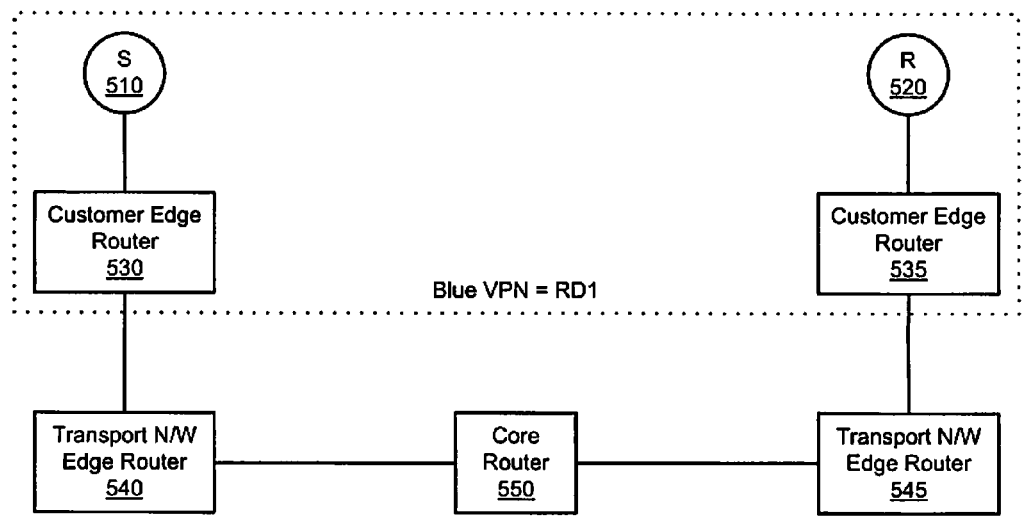
FIG. 5 is a simplified block diagram illustrating a connection between a source and receiver, as illustrated in FIG. 4, in accord with one embodiment of the present invention.

FIG. 5 is a simplified block diagram illustrating a connection between the source and receiver illustrated in FIG. 4, in accord with one embodiment of the present invention. Source 510 is coupled to customer edge router 530 and receiver 520 is coupled to customer edge router 535. Both source 510 and receiver 520 and the respective customer edge routers are members of the Blue broadcast domain which is identified using resource descriptor RD1. Customer edge router 530 is coupled to transport network edge router 540 and customer edge router 535 is coupled to transport network edge router 545. The two transport network edge routers are coupled to each other via one or more transport network core routers 550.

Upon receiving a multicast datastream join message from customer edge router 535, transport network edge router 545 performs a lookup for source 510 in the Blue broadcast domain which results in an address tuple (RD1,S) and an identification of transport edge router 540 as the next-hop edge router. Transport network edge router 545 can then encode RD1, the source address (S) and the group address (G) in an FEC opaque field value of an LDP message. Transport edge router 545 sends the LDP join message that includes the FEC and an identification of the ingress, or root, edge router 540. The LDP join message can pass from hop to hop within the transport network core, generating local transport tree links from core router to core router (550) within the transport network. Ultimately, transport network edge router 540 receives the LDP join message and determines that the indicated root is itself. In response to such a determination, transport edge router 540 can decode the FEC opaque field to resolve RD1, S, and G. Transport edge router 540 can then look up the (RD1,S) tuple to determine that the source address is in the Blue broadcast domain and the appropriate port of interface toward customer edge router 530. The customer edge router 540 can further associate the built transport tree with the multicast datastream identification (S,G) thereby connecting the transport tree to a multicast datastream tree.

Figure 6:
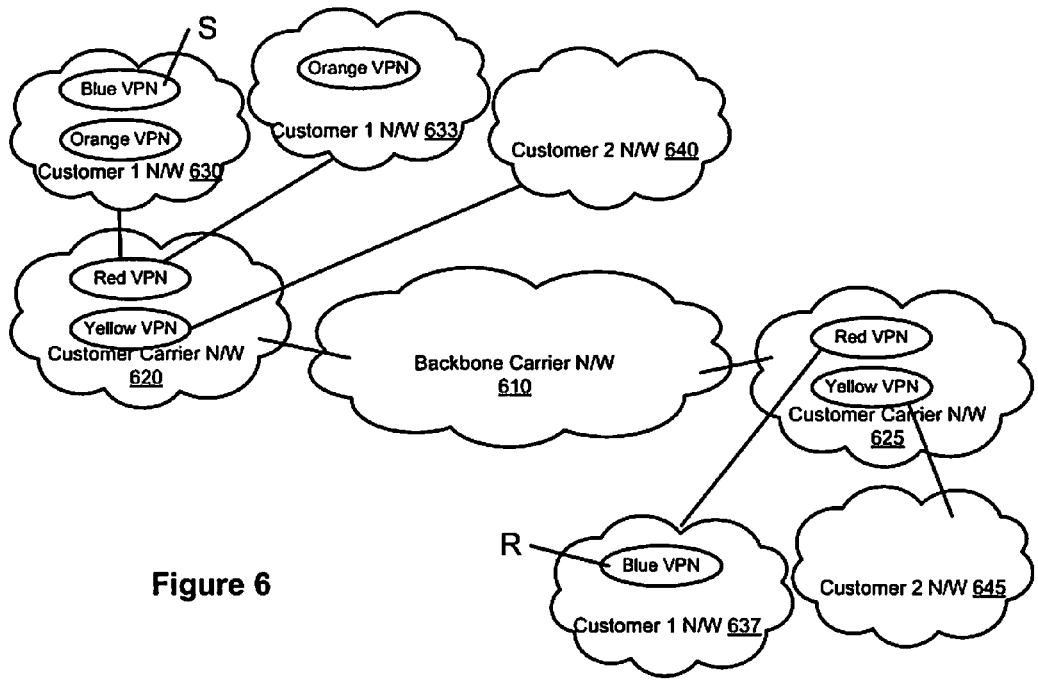
FIG. 6 is a simplified block diagram illustrating a carrier-supporting-carrier network environment appropriate for one implementation of the present invention.

FIG. 6 is representation of a carrier-supporting-carrier network environment appropriate for one implementation of the present invention. A carrier-supporting-carrier network enables one MPLS.VPN-based service provider to allow other service providers to use a segment of the carrier-supporting-carrier's backbone network. The service provider that provides a segment of the backbone network to the other provider is called the backbone carrier. The service provider that uses the segment of the backbone network is called the customer carrier. In other words, a carrier supporting carrier scenario is as if transport network 410 of FIG. 4 is split into two or more diverse pieces that are coupled by another transport network. As illustrated in FIG. 6, backbone carrier transport network 610 couples to customer carrier networks 620 and 625. Customer carrier networks 620 and 625 are configured with Red and Yellow VPN-type broadcast domains. The Red VPN of customer carrier network 620 is coupled to two diverse segments of Customer 1 network 630 and 633. And the Red VPN of customer carrier network 625 is coupled to another Customer 1 network 637. Similarly Customer 2 network 640 is coupled to the Yellow VPN of customer carrier network 620 and Customer 2 network 645 is coupled to the Yellow VPN of customer carrier network 625. As illustrated Customer 1 network includes a Blue and an Orange VPN, wherein a multicast datastream source (S) is included within the Blue VPN of Customer 1 network 630 and a receiver (R) for that multicast datastream is located within the Blue VPN of Customer network 637.

Figure 7:
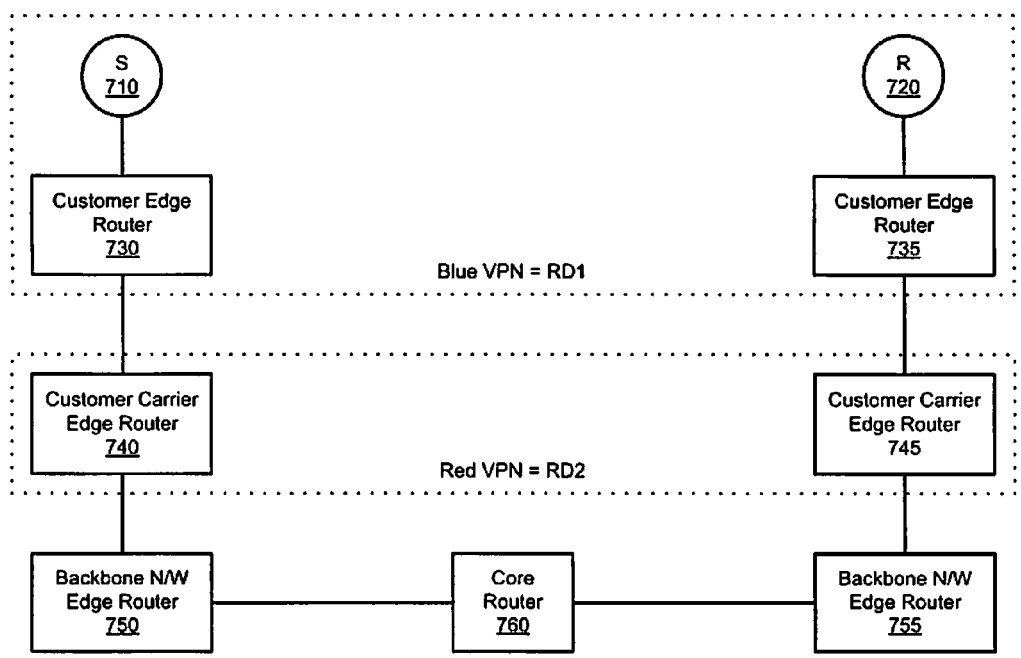
FIG. 7 is a simplified block diagram illustrating a connection between a source and receiver across a carrier-supporting-carrier network in accord with one embodiment of the present invention.

FIG. 7 is a simplified block diagram illustrating a connection between a multicast source and receiver across a carrier-supporting-carrier network in accord with embodiment of the present invention. FIG. 7 further illustrates the nested nature of a source to receiver connection in the carrier-supporting-carrier environment. As is shown below, the nested connection configuration can result in a recursive calculation of transport tree identifiers across the backbone carrier and customer carrier transport networks.

Source 710 is coupled to customer edge router 730, while receiver 720 is coupled to customer edge router 735, all of which are members of the Blue VPN which can be identified by resource descriptor RD1. Customer edge router 730 is coupled to customer carrier edge router 740 and customer edge router 735 is coupled to customer carrier router 745. The customer carrier edge router 745 can generate a transport tree identifier FEC1 having an opaque field value that encodes (RD1,S),G where S is the address of source 710 and G is the multicast group destination address for the multicast datastream. Such a calculation is substantially the same as that performed in relation to FIG. 5.

Customer carrier edge router 740 is coupled to customer carrier edge router 750 via customer carrier network 620. Similarly, customer carrier edge router 745 is coupled to backbone carrier edge router 755 through customer carrier network 625. In generating a transport tree identifier for backbone carrier transport network 610, backbone carrier edge router 755 can generate a transport tree identifier FEC2 having an opaque field value that encodes (RD2,PE 740),FEC1, where RD2 is a resource descriptor for the Red VPN of which customer carrier edge routers 740 and 745 are members, PE 740 is the address of customer carrier edge router 740, and FEC1 is the transport tree identifier generated by customer carrier edge router 745. FEC2 can then be used as a transport tree identifier for core routers 760 within the backbone carrier transport network 610.

Backbone carrier edge router 750 can then decode transport tree identifier FEC2, determining the resource descriptor for the Red VPN, the destination address of customer carrier edge router 740, and the transport tree identifier FEC1. This information can be used to continue building the transport tree within customer carrier network 620 to customer carrier edge router 740, which in turn decodes transport tree identifier FEC1 to ultimately connect with the source of the multicast datastream.

Using such a recursive transport tree identifier, the root encoding of the transport tree can be changed in order to transit a backbone carrier transport network. The root (or ingress edge router) of the transport tree from the perspective of customer carrier edge router 745 is customer carrier edge router 740. But to create a transport tree between those edge routers one must transit backbone carrier network 610. So at backbone carrier edge router 755 a new root of the transport tree is used to get to the other edge of the backbone carrier transport network; that new root is backbone carrier edge router 750. The original root information for the customer carrier network can be retained in transport tree identifier FEC2 through the use of the (RD2, PE 740) tuple, while the originally calculated transport tree identification information is retained by including FEC1 in FEC2.

Figure 8:
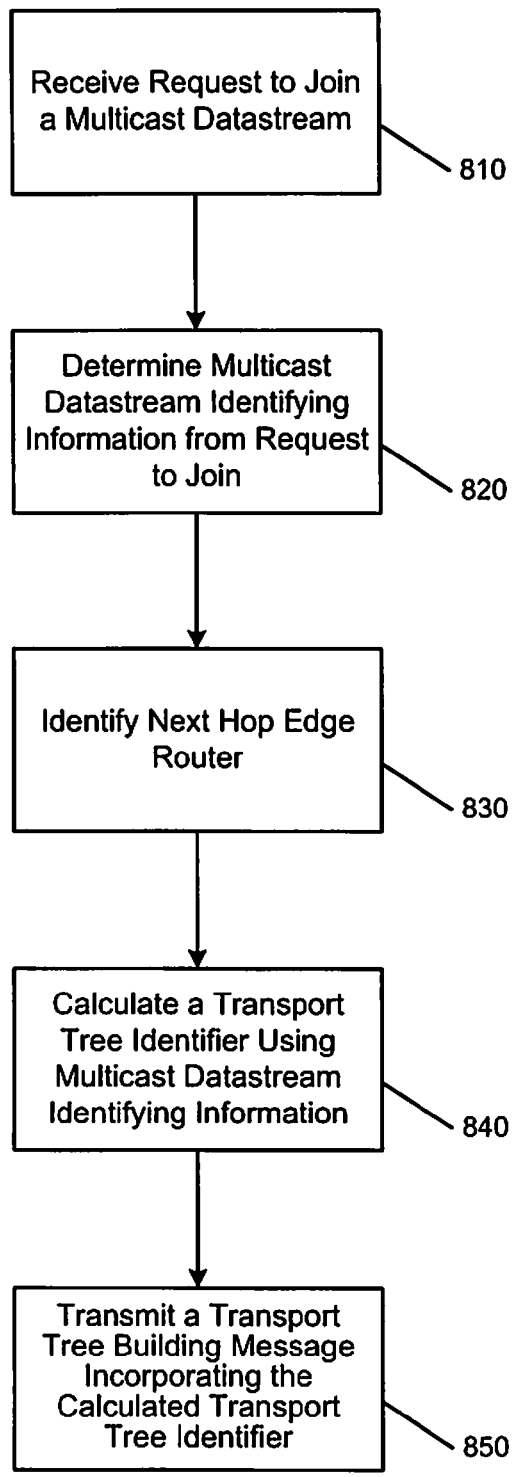
FIG. 8 is a simplified flow diagram illustrating steps performed by an egress router in response to a request to join the multicast datastream, in accord with one embodiment of the present invention.

FIG. 8 is a simplified flow diagram illustrating steps performed by an egress router in response to a request to join the multicast datastream, in accord with one embodiment of the present invention. An egress edge router can receive a request to join a multicast datastream from a downstream node (810). Such a request can take the form of an IGMP message from a network element or a PIM join message from a downstream router. Join messages can include identifiers of a multicast datastream source and group destination address. The egress edge router can determine multicast datastream identifying information from the join message (820). The egress edge router can then identify a next-hop edge router upstream toward the source of the requested multicast datastream (830). From the multicast datastream identifying information, the egress edge router can calculate a transport tree identifier (840). The calculated transport tree identifier can be used as an FEC value or included as an FEC opaque field value in an LDP message sent through the transport network. The calculated transport tree identifier can include information about the multicast datastream such as broadcast domain, source address, and group destination address. The egress edge router can then transmit a transport tree building message that includes the transport tree identifier to a next-hop upstream router (850). The transport tree building message (e.g, LDP) will enable the core routers of the transport network to build a transport tree connecting the egress edge router with the identified next-hop edge router.

Figure 9:
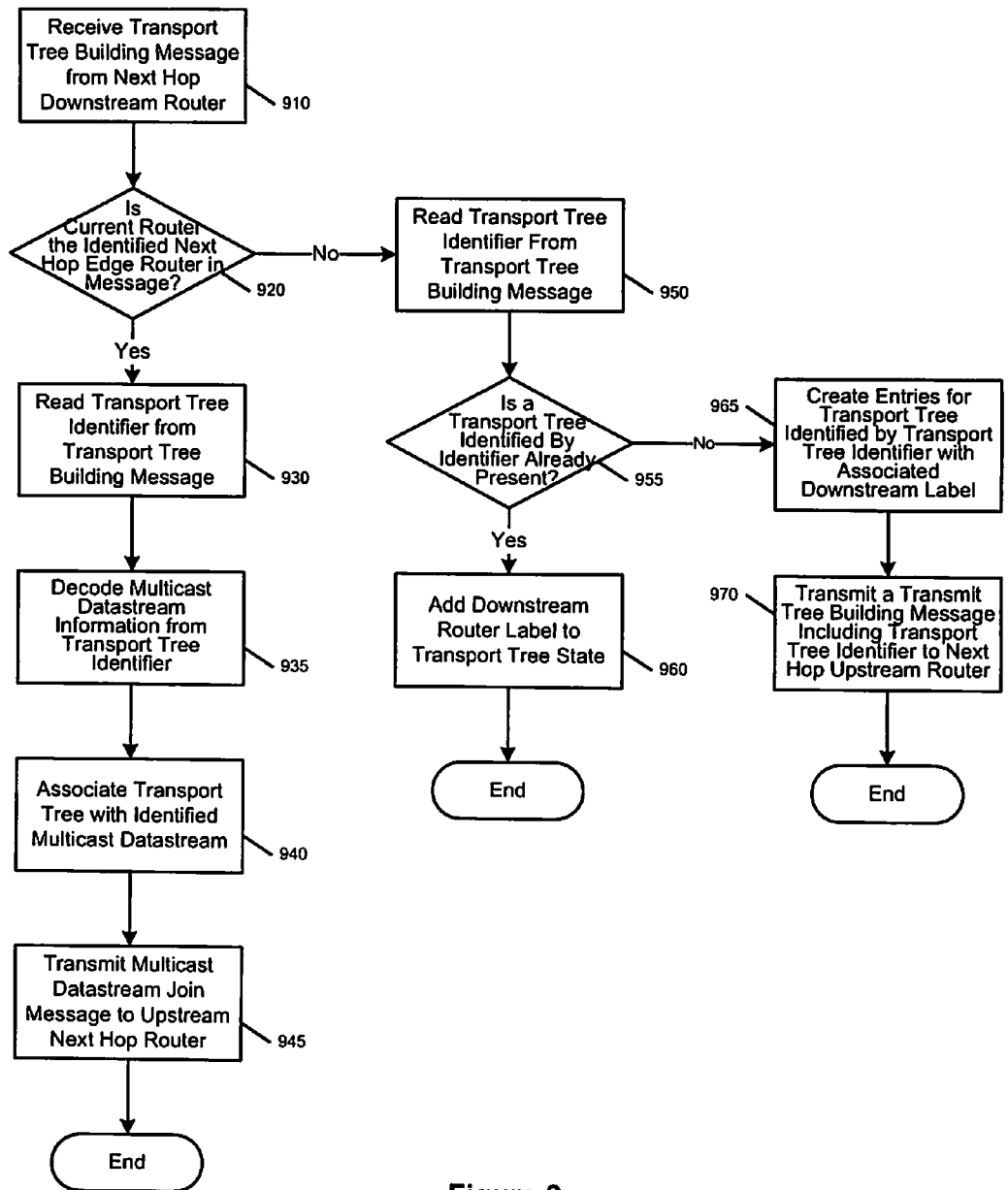
FIG. 9 is a simplified flow diagram illustrating steps performed by a router in response to receiving a transport tree building message incorporating a transport tree identifier in accord with one embodiment of the present invention.

FIG. 9 is a simplified flow diagram illustrating steps that can be performed by a router in response to receiving a transport tree building message incorporating a transport tree identifier in accord with one embodiment of the present invention. The current router receives a transport tree building message from a downstream next-hop router (910). Examining the transport tree building message, the current router can determine whether it is the next-hop edge router identified in the transport tree building message (920). If the current router is the identified next-hop edge router, then the current router can read the transport tree identifier from the transport tree building message (930) and decode the multicast datastream identification information from the transport tree identifier (935) (e.g., from the FEC opaque field value). The current router can then associate the transport tree built by the transport tree building message with the multicast datastream (940). The current router can further transmit a message to join the multicast datastream to an upstream next-hop router toward the source of the multicast datastream (945).

If the current router is not the identified next-hop edge router, then the current router can read the transport tree identifier from the transport tree building message (950) and determine whether a transport tree identified by the transport tree identifier is already present on that router (955). If a transport tree identified by the transport tree identifier is already present on the current router, then a label for the downstream router from which the transport tree building message was received can be added to transport tree state information on the current router. If there is no transport tree corresponding to the transport tree identifier present, then the current router can create transport tree entries corresponding to the transport tree identifier that include, for example, a label for the downstream next-hop router from which the transport tree building message was received (965). The current router can then transmit a transport tree building message including the transport tree identifier to an upstream next-hop router (970). In this manner, a transport tree corresponding to the transport tree identifier can be built that couples the egress edge router with the ingress edge router across the transport network.

An Example Computing and Network Environment

Figure 10:
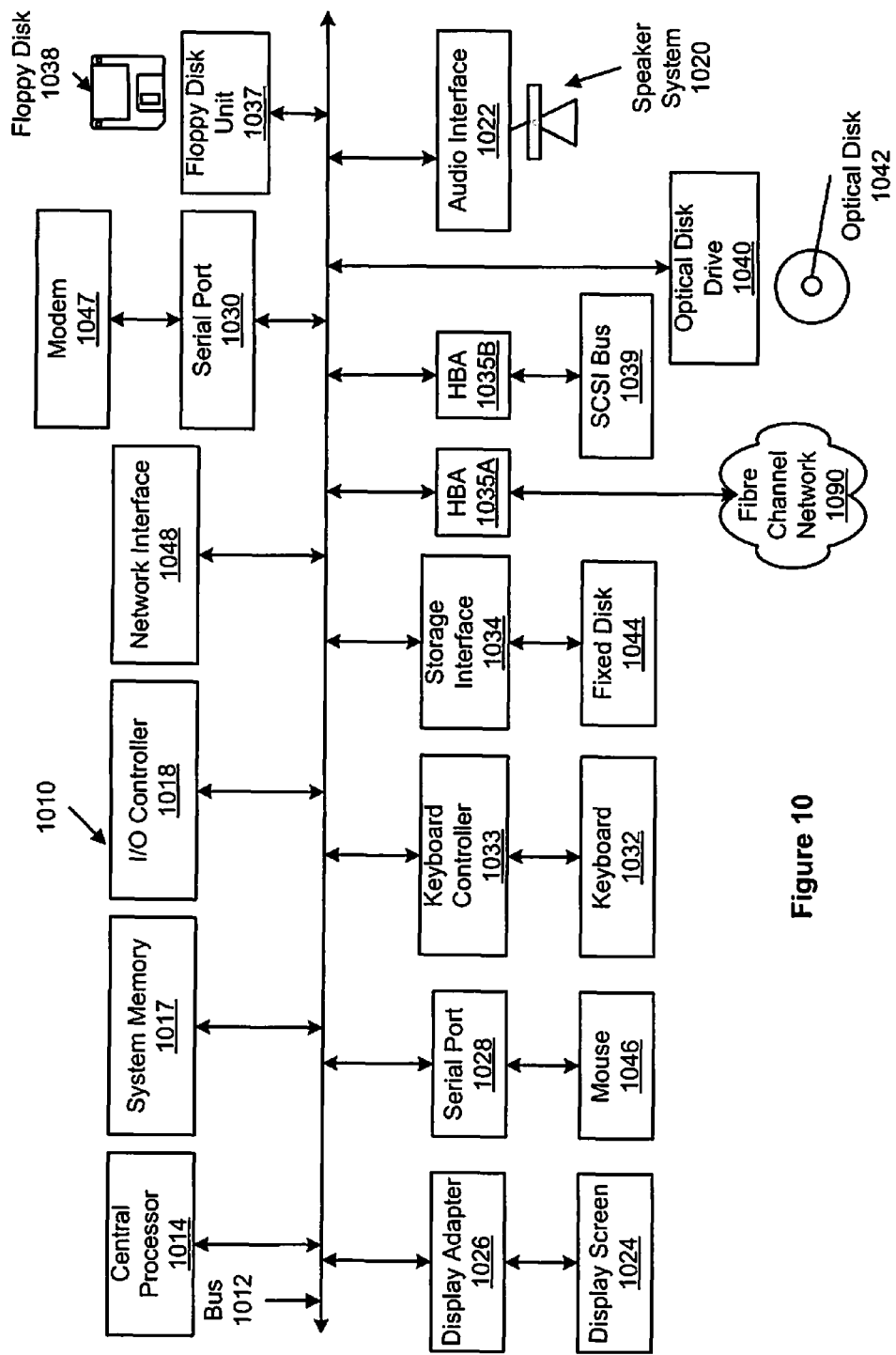
FIG. 10 is a simplified block diagram of a computer system suitable for implementing one embodiment of the present invention.

FIG. 10 depicts a block diagram of a computer system 1010 suitable for implementing the present invention. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a fibre channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 10 need not be present to practice the present invention. The devices and subsystems can be interconnected in different ways from that shown in FIG. 10. The operation of a computer system such as that shown in FIG. 10 is readily known in the art and is not discussed in detail in this application. Code to implement the present invention can be stored in computer-readable storage media such as one or more of system memory 1017, fixed disk 1044, optical disk 1042, or floppy disk 1038. Additionally, computer system 1010 can be any kind of computing device using an operating system that provides necessary data access features and capabilities.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
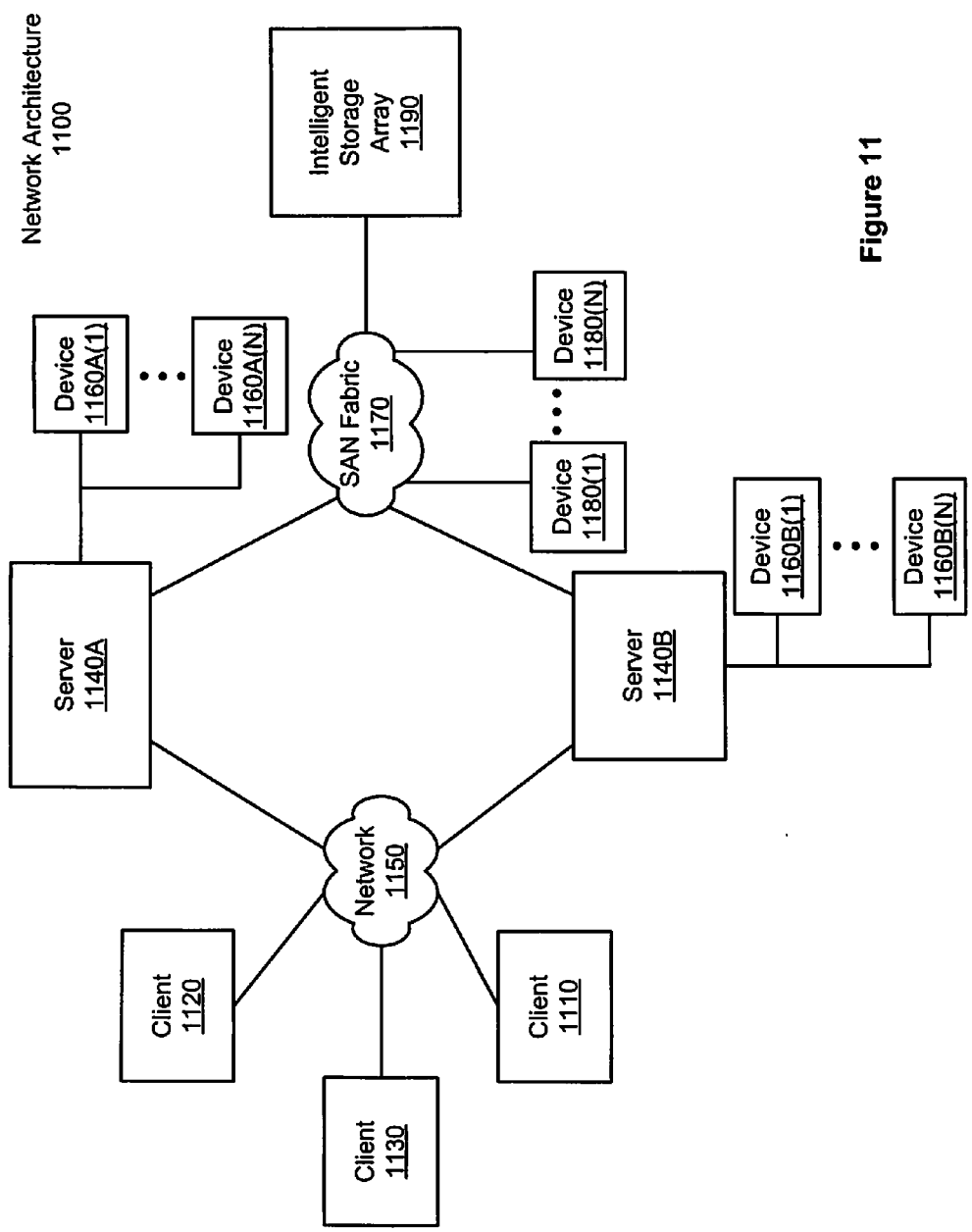
FIG. 11 is a simplified block diagram of a network architecture suitable for implementing one embodiment of the present invention.

FIG. 11 is a block diagram depicting a network architecture 1100 in which client systems 1110, 1120 and 1130, as well as storage servers 1140A and 1140B (any of which can be implemented using computer system 1010), are coupled to a network 1150. Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation of the invention. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present invention is not limited to the Internet or any particular network-based environment.

An Example Router

Figure 12:
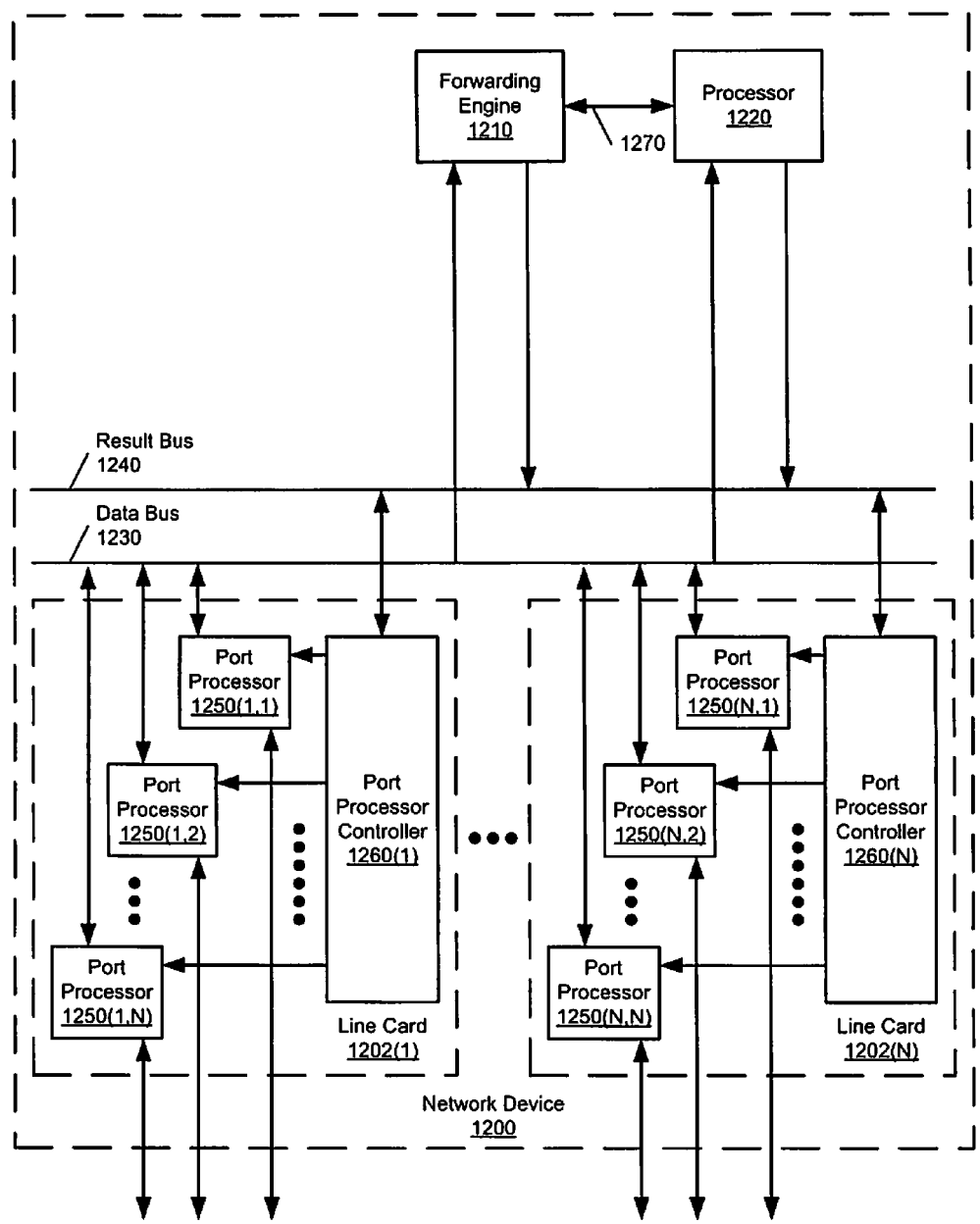
FIG. 12 is a simplified block diagram of a network router element suitable for implementing one embodiment of the present invention.

FIG. 12 is a block diagram illustrating a network router element. In this depiction, network router element 1200 includes a number of line cards (line cards 1202(1)-(N)) that are communicatively coupled to a forwarding engine 1210 and a processor 1220 via a data bus 1230 and a result bus 1240. Line cards 1202(1)-(N) include a number of port processors 1250(1,1)-(N,N) which are controlled by port processor controllers 1260(1)-(N). It will also be noted that forwarding engine 1210 and processor 1220 are not only coupled to one another via data bus 1230 and result bus 1240, but are also communicatively coupled to one another by a communications link 1270.

When a packet is received, the packet is identified and analyzed by a network router element such as network router element 1200 in the following manner, according to embodiments of the present invention. Upon receipt, a packet (or some or all of its control information) is sent from the one of port processors 1250(1,1)-(N,N) at which the packet was received to one or more of those devices coupled to data bus 1230 (e.g., others of port processors 1250(1,1)-(N,N), forwarding engine 1210 and/or processor 1220). Handling of the packet can be determined, for example, by forwarding engine 1210. For example, forwarding engine 1210 may determine that the packet should be forwarded to one or more of port processors 1250(1,1)-(N,N). This can be accomplished by indicating to corresponding one(s) of port processor controllers 1260(1)-(N) that the copy of the packet held in the given one(s) of port processors 1250(1,1)-(N,N) should be forwarded to the appropriate one of port processors 1250(1,1)-(N,N).

In the foregoing process, network security information can be included in a frame sourced by network routing device 1200 in a number of ways. For example, forwarding engine 1210 can be used to detect the need for the inclusion of network security information in the packet, and processor 1220 can be called into service to provide the requisite network security information. This network security information can be included in the packet during the transfer of the packet's contents from one of port processors 1250(1,1)-(N,N) to another of port processors 1250(1,1)-(N,N), by processor 1220 providing the requisite information directly, or via forwarding engine 1210, for example. The assembled packet at the receiving one of port processors 1250(1,1)-(N,N) can thus be made to contain the requisite network security information.

In addition, or alternatively, once a packet has been identified for processing according to the present invention, forwarding engine 1210, processor 1220 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1010). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed.

The above description is illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed can be made based on the description set forth, without departing from the scope of the invention.

Consequently, the invention is intended to be limited only by the scope of the appended claims, giving full cognizance to equivalents in all respects.

What is claimed is:

1. A method comprising:
   receiving, at an egress router, a request to join a multicast datastream;
   determining, at the egress router, one or more identifiers for the multicast datastream from the request to join;
   generating, at the egress router, a transport tree identifier using the one or more identifiers for the multicast datastream, wherein
      the transport tree identifier identifies a transport tree to be constructed to span a transport network from an ingress router to the egress router, and
      the ingress router is upstream toward a source of the multicast datastream from the egress router; and
   transmitting, from the egress router, a transport tree building message to a neighbor router, wherein
      the transport tree building message comprises the transport tree identifier, and
      the transport tree building message is used to build the transport tree across the transport network.

2. The method of claim 1 wherein the one or more identifiers for the multicast datastream comprise
   one or more of a multicast source address and a multicast group address.

3. The method of claim 1 further comprising:
   identifying a root router in the transport network, wherein
      the root router is upstream toward a source of the multicast datastream;
      the neighbor router is a next-hop router toward the root router.

4. The method of claim 1 wherein the transport network comprises a multiprotocol label switching (MPLS) network.

5. The method of claim 4 wherein the transport tree building message comprises:
   a label distribution protocol (LDP) message.

6. A method comprising:
   receiving, at an ingress router, a transport tree building message for a transport tree comprising a transport tree identifier, wherein
      the transport tree identifier identifies a transport tree spanning a transport network from the ingress router to an egress router,
      the transport tree building message is used to build the transport tree across the transport network;
   decoding, by the ingress router, information encoded in the transport tree identifier;
   generating, by the ingress router, an identifier for a multicast datastream from the information; and
   associating, by the ingress router, the multicast datastream with the transport tree.

7. The method of claim 6 wherein the transport tree identifier comprises:
   information related to one or more of a multicast source address, a multicast group address, and a broadcast domain identifier.

8. The method of claim 6 further comprising:
   transmitting a request to receive the multicast datastream to a neighbor network node, wherein
      the neighbor network node is upstream toward a source of the multicast datastream.

9. An egress router element comprising:
   a plurality of network line cards, wherein
      a first network line card of the plurality of network line cards is configured to transmit a transport tree building message to a neighbor router, wherein the transport tree building message comprises
         a transport tree identifier identifying a transport tree to be constructed to span a transport network from an ingress router to the egress router,
         the transport tree building message is used to build the transport tree across the transport network;
      a second network line card of the plurality of network line cards coupled to a broadcast domain and configured to receive a message to join a multicast datastream from a node in the broadcast domain;
   a switch fabric comprising a plurality of ports, wherein
      each of the plurality of ports is coupled to a corresponding one of the plurality of network line cards, and
      a first port is coupled to the first network line card; and
   a processor coupled to the switch fabric, wherein
      the processor is configured to
         determine one or more identifiers for the multicast datastream from the request to join the multicast datastream, and generate the transport tree identifier using the one or more identifiers for the multicast datastream.

10. The router element of claim 9 wherein the one or more identifiers for the multicast datastream comprise
one or more of a multicast source address and a multicast group address.

11. An ingress router element comprising:
a plurality of network line cards, wherein
a first network line card of the plurality of network line cards is configured to receive a transport tree building message for a transport tree, wherein the transport tree building message comprises
a transport tree identifier identifying a transport tree spanning a transport network from the ingress router to an egress router, and
the transport tree building message is used to build the transport tree across the transport network;
a switch fabric comprising a plurality of ports, wherein
each of the plurality of ports is coupled to a corresponding one of the plurality of network line cards, and
a first port is coupled to the first network line card; and
a processor coupled to the switch fabric, wherein the processor is configured to
decode information encoded in the transport tree identifier,
generate an identifier for a multicast datastream from the information, and
associate the multicast datastream with the transport tree.

12. The router element of claim 11 wherein
the information is related to one or more of a multicast source address, a multicast group address, and a broadcast domain identifier.

13. The router element of claim 11 further comprising:
a second line card configured to transmit a request to receive the multicast datastream to a neighbor network node, wherein
the neighbor network node is upstream toward a source of the multicast datastream.

14. An apparatus comprising:
a plurality of network line cards, wherein
a first network line card of the plurality of network line cards is configured to transmit a transport tree building message to a neighbor router, wherein the transport tree building message comprises
a transport tree identifier identifying a transport tree to be constructed to span a transport network from an ingress router to an egress router,
the ingress router is upstream toward a source of a multicast datastream from the egress router, and
the transport tree building message is used to build the transport tree across the transport network; and
a second network line card of the plurality of network line cards coupled to a broadcast domain and configured to receive a message to join the multicast datastream from a node in the broadcast domain;
a switch fabric comprising a plurality of ports, wherein
each of the plurality of ports is coupled to a corresponding one of the plurality of network line cards, and
a first port is coupled to the first network line card;
means for determining one or more identifiers for the multicast datastream from the message to join the multicast datastream; and
means for generating the transport tree identifier using the one or more identifiers for the multicast datastream.

15. An apparatus comprising:
a plurality of network line cards, wherein
a first network line card of the plurality of network line cards is configured to receive a transport tree building message for a transport tree, wherein the transport tree building message comprises
a transport tree identifier identifying a transport tree spanning a transport network from an ingress router to an egress router, and
the transport tree building message is used to build the transport tree across the transport network using the transport tree identifier;
a switch fabric comprising a plurality of ports, wherein
each of the plurality of ports is coupled to a corresponding one of the plurality of network line cards, and
a first port is coupled to the first network line card;
means for decoding information encoded in the transport tree identifier;
means for generating an identifier for a multicast datastream from the information; and
means for associating the multicast datastream with the transport tree.

* * * * *